(12) United States Patent
Sites et al.

(10) Patent No.: US 7,149,721 B1
(45) Date of Patent: Dec. 12, 2006

(54) ELECTRONIC CONTENT RIGHTS WITH AND-OR EXPRESSION

(75) Inventors: Richard L. Sites, Menlo Park, CA (US); James D. Pravetz, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1085 days.

(21) Appl. No.: 09/655,119

(22) Filed: Sep. 5, 2000

(51) Int. Cl.
*G06H 17/60* (2006.01)
*H04L 1/00* (2006.01)

(52) U.S. Cl. .............................. 705/59; 705/50; 705/51; 705/52; 705/53; 705/54; 705/55; 705/56; 705/57; 705/58; 713/193; 380/232

(58) Field of Classification Search .................. 705/59, 705/65, 1, 55, 51, 50, 52, 53, 54, 56, 57, 705/58, 60; 380/228; 713/165, 174, 194
See application file for complete search history.

(56) References Cited

U.S. PATENT DOCUMENTS

| 5,745,879 | A * | 4/1998 | Wyman ......................... 705/1 |
| 6,226,618 | B1 * | 5/2001 | Downs et al. .................. 705/1 |
| 6,240,185 | B1 * | 5/2001 | Van Wie et al. ............... 705/51 |
| 6,289,455 | B1 * | 9/2001 | Kocher et al. ................. 705/51 |
| 2002/0049679 | A1 * | 4/2002 | Russell et al. ................. 705/52 |
| 2004/0059678 | A1 * | 3/2004 | Stefik et al. ................... 705/51 |

OTHER PUBLICATIONS

Russell et al, U.S. Appl. No. 60/195,870.*
Seybold New York: Hot Trends and Product announcements (May 1998) www.dtpjournal.com/archives/9805d1.html.*
FileOpen Personal Publisher 1.0 User Manual (v10) Jun. 1, 2000.*
About FileOpen Publisher (Feb. 9, 2001) www.fileopen.com/fopubpage.html.*
Web page describing Digitalgoods services and products, which were available as of Mar. 1997 (according to reference AR).

(Continued)

*Primary Examiner*—James P. Trammell
*Assistant Examiner*—Cristina Owen Sherr
(74) *Attorney, Agent, or Firm*—Fish & Richardson P.C.

(57) ABSTRACT

Methods and apparatus for creating a license defining permissions to use electronic content. The methods include selecting a plurality of habitat types, each an aspect of a user environment to which a license can be bound, the selection based on input from a retail customer; determining one or more habitat values and relations for each selected type; and creating a license to use the electronic content, the license including an and-or logic expression of habitat terms, each term containing one of the selected types and its set of corresponding values and relations. Each habitat term may include a key for decrypting or unlocking the electronic content. In another aspect, the methods include receiving from a retail customer an input selecting habitat types and one or more habitat values for each selected type; and requesting from a server a license file to permit use of an electronic content, the license file including an and-or logic expression of habitat terms, each term containing one of the selected types and its corresponding values. In another aspect, the methods include receiving electronic content at a user computer; receiving a license file permitting use of the electronic content at the user computer, the license file including an and-or logic expression of habitat terms, each term containing a set of access permissions; extracting the set of permissions from an evaluation of the expression that renders the expression true; and allowing an end user to access the electronic content according to the extracted permissions.

66 Claims, 2 Drawing Sheets

OTHER PUBLICATIONS

Web page of Seybold Report in Internet Publishing, dated Mar. 1997, describing new Softlock (d/b/a Digitalgoods) products.

Web page describing FileOpen PersonalPublisher, a product released on Jul. 10, 2000.

User Manual v. 10, dated Jun., 1, 2000, for FileOpen PersonalPublisher.

Web page describing FileOpen Publisher v. 2.4, a product whose version 2 was available as of May, 1998 (according to reference AV).

Web page of Seybold Highlights, announcing the release of FileOpen Publisher v. 2 in May 1998.

* cited by examiner

FIG. 1

ELECTRONIC CONTENT RIGHTS WITH AND-OR EXPRESSION

BACKGROUND OF THE INVENTION

The present invention relates to creating a license for electronic content.

With the growing demand for online content, providers—publishers, distributors, and Web retailers—of distributed electronic content often desire to restrict access to the content to authorized users only. A copyright holder may wish to restrict access to those individuals who have paid for a copy of an electronic book, for example.

Some electronic content is distributed in a freely-readable form, that is, with no protection against unauthorized use or copying. Other content is distributed in some encrypted or otherwise unreadable form. For example, encrypted documents require a decryption key or other mechanism for rendering the document readable to an authorized user. Some of these decryption mechanisms use the same encrypted document and same key for all users. Others produce a specifically-encrypted document and unique key for each user. Yet others use the same encrypted document for all users, but supply a separate decryption, or rights license file, that is unique to each user and is in some way tied to the user's computing environment.

Prior rights license designs tie a license to a single computing environment, such as a serial number associated with a hard disk in the authorized user's computer. The corresponding electronic content can be accessed only from that hard disk or if that hard disk is present.

SUMMARY OF THE INVENTION

In general, in one aspect, the invention provides methods, and apparatus implementing the methods, for creating a license defining permissions to use electronic content. The methods include selecting a plurality of habitat types, each of which is an aspect of a user environment to which a license can be bound, where the selection is based on input from a retail customer; determining a set of one or more habitat values and relations for each of the selected habitat types; and creating a license to permit use of the electronic content, where the license includes an and-or logic expression of habitat terms and each habitat term contains one of the selected habitat types and its set of corresponding habitat values and relations. Each habitat term may include a key for decrypting or unlocking the electronic content.

In general, in another aspect, the invention provides methods, and apparatus implementing the methods, for obtaining a license file to electronic content. The methods include receiving from a retail customer an input selecting a plurality of habitat types and a set of one or more habitat values for each of the selected habitat types; and requesting from a server a license file to permit use of an electronic content, the license file including an and-or logic expression of habitat terms, each habitat term containing one of the selected habitat types and its corresponding set of habitat values.

In general, in another aspect, the invention provides methods, and apparatus implementing the methods, for allowing an end user to access electronic content. The methods include receiving electronic content at a user computer; receiving a license file permitting use of the electronic content at the user computer, the license file including an and-or logic expression of habitat terms, each habitat term containing a set of access permissions; extracting the set of access permissions from an evaluation of the expression that renders the expression true; and allowing an end user to access the electronic content according to the extracted set of access permissions applicable to the electronic content.

Advantages that can be seen in implementations of the invention include one or more of the following. The invention allows different access rights, decryption keys and access permissions for multiple different habitat types to be described in a single license file. The invention also allows a retail customer to select some or all of the habitat types to which the license is bound.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
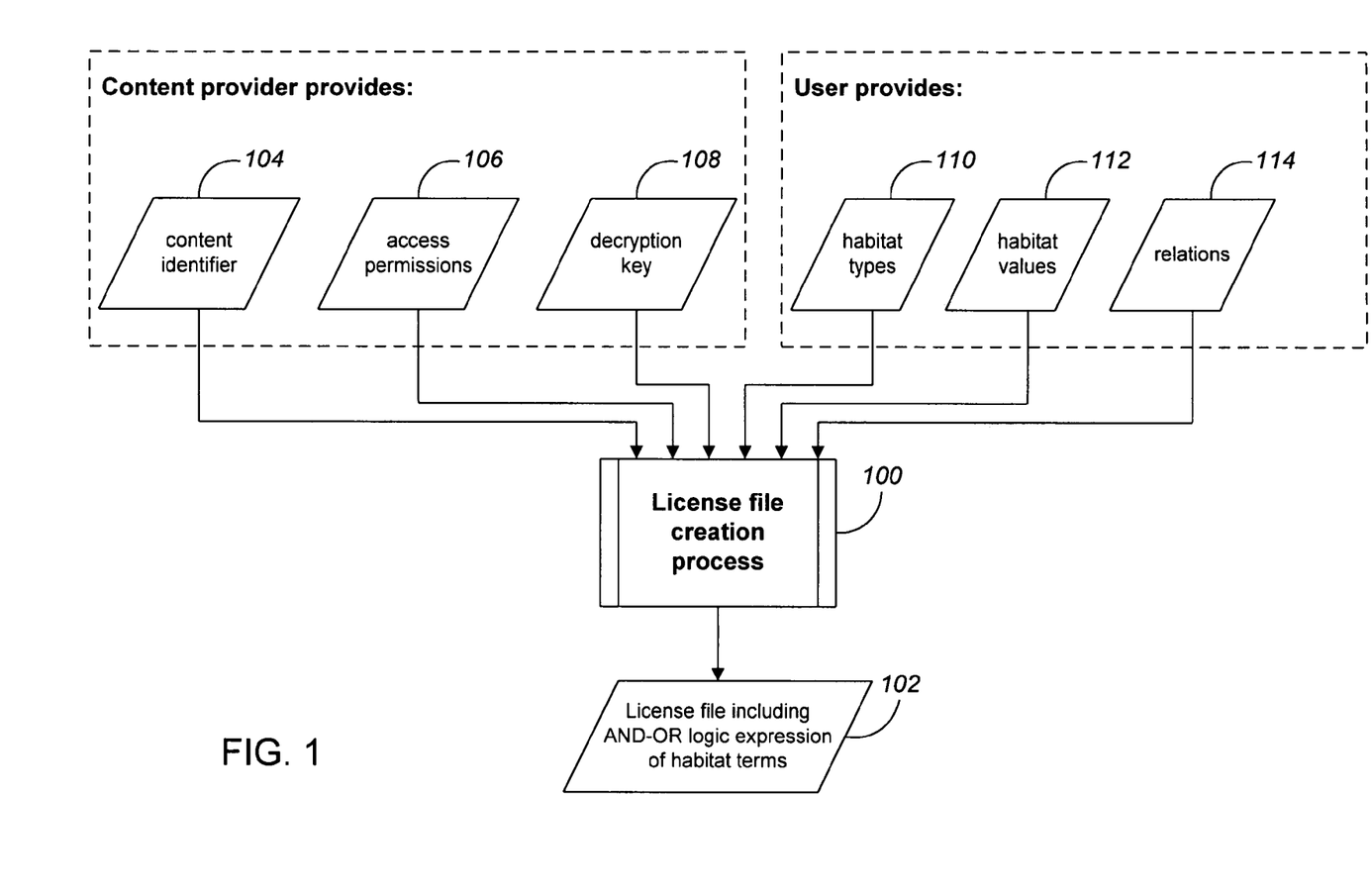
FIG. 1 shows a license file creation process in accordance with the present invention.

FIG. 1 shows a license file creation process 100 in accordance with the present invention. It creates a license file 102 suitable for use with locked (encrypted) electronic content. The term "electronic content" can apply to an electronic document, a piece of software, or an electronic file including sound bytes, images or movie clips; however, only the electronic document will be used in the examples in this specification.

Typically, a license file 102 includes encrypted and encoded information that: (a) identifies electronic content; (b) specifies the permissions a user has for the electronic content; (c) provides a key that can be used to decrypt the electronic content; and (d) determines the environment in which the electronic content can be accessed. In one implementation, the license file 102 includes a header and a license. The header includes a content identifier 104 that identifies the electronic content uniquely. The identifier 104 allows the user to locate (e.g., in a content provider's database) and obtain a copy of the electronic content. The license specified in the license file 102 is an AND-OR logic expression of habitat terms that defines the combination of habitat term conjunctions and disjunctions that have to be satisfied for an electronic content to be made available. In one implementation, each habitat term is of the format:

<relation; name="habitat type"; value="habitat value"; key="binary data">where "relation" is one of:

eq—equal to
ne—not equal to
ge—greater than or equal to
le—less than or equal to
gt—greater than
lt—less than.

A habitat type 110 is any type of user environment (or user environment feature) to which the license can be bound. Suitable habitat types 110 include (but are not limited to) a central processing unit (CPU), hard disk, removable floppy disk, CDROM, removable disk cartridge, flash memory card, network drive, user login name, fingerprint, handwritten signature, other user biometric data, user-possessed smart card, time and geographic location. Each habitat value 112 is an identifier for a particular habitat type 110. For example, a habitat value 112 can be a device-specific serial number such as a central processing unit (CPU) number, a hard disk serial number, a removable floppy disk serial number, a CD-ROM serial number, a removable disk cartridge serial number, a flash memory card serial number, a network drive serial number; a user-specific login name; a user-specific fingerprint; a user-specific handwritten signature; a user-specific voiceprint; a user-specific retinal scan; a Coordinated Universal Time (UTC) time or equivalent; a local time; or a geographic location such as a global positioning system (GPS) location or a digital video disc (DVD) country code identifying a geographic region. Typically, for habitat types 110 that reference a CPU or a storage device, only the "eq" and "ne" relations 114 apply.

The key of a habitat term is encoded binary data that can be extracted and decoded to obtain a decryption key 108 and a set of access permissions 106 for the electronic content. Although the decryption key 108 and the access permissions 106 can be extracted from the key of any habitat term, this information is generally only extracted once by using the last habitat term that is evaluated (e.g., the first habitat term that evaluates to true in an ORed set of habitat terms, or the last habitat term that evaluates to true in an ANDed set of habitat terms) to grant a user access to the electronic content. In alternative implementations, the access permissions 106 are extracted from the keys of more than one habitat term. The access permissions 106 specify the types of actions, such as text selection, printing and annotation, that are permitted on the electronic content once it is decrypted using the decryption key 108. During the electronic content locking process, the content provider (e.g., a publisher) can embed in the electronic content a universal set of access permissions—i.e., a set of permissions permitting an end user to perform every type of action on the electronic content. If this is the case, then the universal set of access permissions and the extracted access permissions 108 are ANDed together to create a restricted set of permissions that are applied to the electronic content.

The AND-OR expression of habitat terms can be arbitrarily complex. In other words, the expression is not subject to pre-determined limitations as to length (i.e., the number of habitat terms), content (i.e., the habitat types 110 and the habitat values 112 in each habitat term), relations, or nesting. Using an AND-OR expression of habitat terms allows a single license to be used with a combination of habitat term disjunctions and conjunctions. Expressing habitat term disjunctions allows a single license to be used on multiple computers. Setting different access rights for each habitat term allows, for example, in a classroom setting having one teacher computer and thirty student computers, a single license to permit the printing of a document on the teacher computer and not on the thirty student computers. Expressing habitat term disjunctions also allows for robustness of use. For example, a user can access an electronic content using the same license even if one of the habitat types 110 in the license, such as a hard disk, is changed as a result of an upgrade. Expressing habitat term conjunctions allows a single license to restrict the access of the electronic content to a required combination of habitat types 110, habitat values 112 and relations 114 between habitat types 110 and habitat values 112, such as (time greater than Jan. 1, 2000) AND (time less than Dec. 12, 2001) AND (CPU equal 1234) OR (CDROM equal 567). A single license can include multiple AND-OR expressions of nested habitat terms. An example of a license including nested AND-OR expressions is (time greater than Jan. 1, 2000) AND {(time less than Dec. 12, 2001) AND ((CPU equal 1234) OR (CDROM equal 567))} OR {(time less than Dec. 12, 2001) AND (CPU equal 4567) OR (CDROM equal 891)}.

Generally, the term "user" refers to both a consumer interacting with a broker program to obtain a license file for use with electronic content and to a consumer using a license file to access electronic content. At times in this specification, it will be important to distinguish between these two types of consumers. In these situations, the term "end user" will refer to the consumer using a license file and the term "retail customer" will refer to the consumer interacting with a broker program to obtain a license file. It should be noted that the retail customer can obtain a license file for his own use as an end user, or alternatively obtain a license file for use by someone else. Returning to the classroom setting example provided above, a teacher can be the retail customer interacting with a broker program to obtain a license file for thirty-one end users—i.e., one end user using the teacher computer and thirty end users using the student computers.

Figure 2:
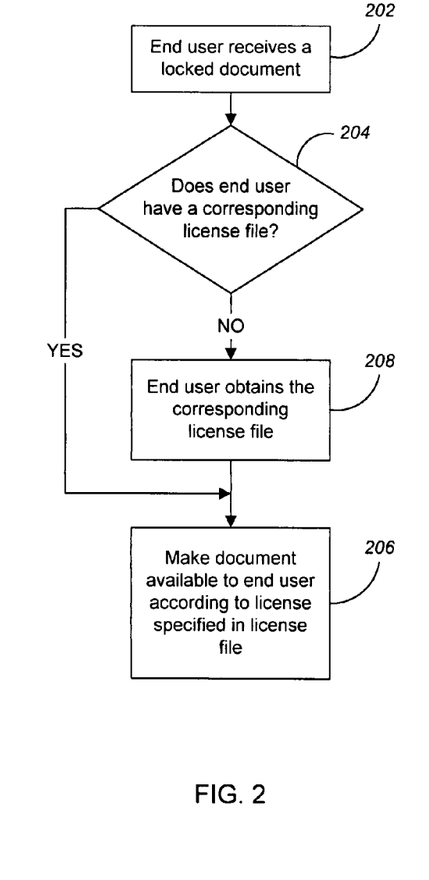
FIG. 2 is a flowchart of a process in accordance with the present invention.

As shown in FIG. 2, an end user receives a locked electronic document (step 202) through some form of distribution. The end user might have downloaded the locked document from a web site—the content provider's web site, for example—onto a personal computer or public kiosk as a result of a purchase. Alternatively, the end user might have received the locked document through super-distribution, i.e., a free distribution of a document through e-mail, on CD-ROM or over the Web.

A user program can be distributed with each locked document and loaded onto a computer by the end user, if necessary (e.g., the computer does not already have a loaded user program, or the computer has an older version of the user program). Alternatively, the user program can be downloaded from a content provider's web site as a browser plug-in. The user program provides a graphical user interface through which the end user transacts with the content provider's server and opens a locked document, as described below.

Figure 3:
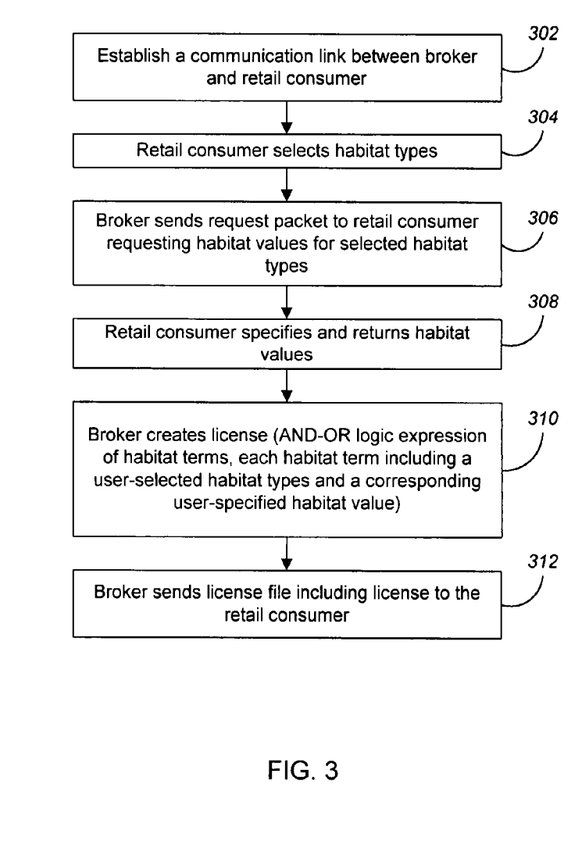
FIG. 3 is a flowchart of a process in accordance with the present invention.

When the end user opens the locked document, the user program performs a search of the end user's computer to locate a corresponding license file 102 (step 204). If the corresponding license file 102 is found, the document is made available to the end user according to the license specified in the license file 102 (step 206). As shown in FIG. 3, if the corresponding license file 102 is not found, the user program establishes a communication link between the end user and a broker program running on the content provider's web server (step 302). Typically, the communication link is a web-based link. The end user is now referred to as a retail customer. Once the communication link is established, the user program launches a selection dialog on the retail customer's computer through which the retail customer and the broker program negotiate terms for the acquisition of a license file 102. Part of the terms of negotiation is establishing how the license stored in the license file 102 will bind the document to prevent free (unauthorized) use of the document, e.g., beyond an end user's computer. The broker program can be configured to allow the retail customer to select all of the habitat types 110 to which the document is bound (step 304). Alternatively, the broker program can specify one or more habitat types 110 ("broker-required habitat types") as required by the content provider and allow the retail customer to select one or more habitat types 110

("user-selected habitat types") to which the document is bound. In one implementation, the selection dialog includes a list of all the habitat types 110 that the user program recognizes as habitat types 110. As new habitat types 110 become available to end users, the list of recognized habitat types 110 may be added to and displayed in selection dialogs of newer versions of the user program. Each habitat type 110 is associated with a check box that can be checked or unchecked by the retail customer to indicate a selection or a non-selection, respectively. The boxes corresponding to the broker-required habitat types may be pre-checked or grayed-out to indicate a selection. Once the habitat types 110 are agreed upon, the broker program can send a request packet to the user program requesting information (i.e., habitat values 112 and relations 114) for the habitat types 110 (step 306).

In one implementation, the user program launches a preferences dialog on the retail customer's computer. The retail customer uses the preferences dialog to control what habitat values 112 are sent to the broker program upon receipt of the request packet. The preferences dialog provides multiple fields in which the retail customer can enter habitat values 112 for the habitat types 110 (step 308). The preferences dialog can include a list of habitat values associated with the habitat types on the retail customer's computer. The retail customer can then drag-and-drop the habitat values from the list of habitat values (e.g., the CPU ID or the serial number of the hard disk installed in the computer the customer is currently using) into the appropriate fields, or manually enter the habitat values of habitat types from another source (e.g., the CPU ID of a different computer or the serial numbers of ten CD-ROMs). Upon receipt of the requested information, the broker program constructs an AND-OR logic expression of habitat terms that includes the user-selected habitat types 110, the broker-required habitat types 110 (if any), and the corresponding user-specified habitat values 112. The broker program can be configured to allow the manner in which the habitat terms are ANDed and ORed together to be defined by: (a) the retail customer exclusively; (b) the content provider with input from the retail customer; (c) the content provider exclusively (i.e., using a pre-defined expression); or (d) a third party, such as a distributor. The broker program can then complete the creation of the license file 102 by including a header (identifier 104) (step 312). The broker program can send the license file 102 to the retail customer over the web-based link or in a separate e-mail message.

The retail customer can store the license file 102 on his computer exclusively or send the license file to one or more end users. Returning to FIG. 2, an end user obtains the license file 102 for the locked document (step 208) and stores it on a computer. From this point on, when the end user opens the locked document, the user program performs a search of the computer, locates the corresponding license file 102, and the locked document is made available to the end user according to the license specified in the license file 102 (step 206).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, optical disks, and solid state memory, such as flash memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). The term "computer" applies to programmable or programmed system, such as is found in a workstation, desktop computer, notebook computer, hand-held computer, personal digital assistant (PDA), or mobile phone.

The invention has been described in terms of particular embodiments. Other embodiments are within the scope of the following claims. For example, the steps of the invention can be performed in a different order and still achieve desirable results. In some embodiments, the license and the content can be stored in a common file. In some embodiments, the retail customer can provide the environment, such as a personal computer, and habitat types and values can be selected automatically from the provided environment.

What is claimed is:

1. A method for creating a license defining permissions to use electronic content, comprising:
    selecting a plurality of habitat types, wherein each habitat type is an aspect of a user environment to which a license can be bound, and wherein the selection is based on input from a retail customer,
    determining a set of one or more habitat values and relations for each of the selected habitat types; and
    creating a license to permit use of the electronic content, the license including an and-or logic expression of habitat terms, each habitat term containing one of the selected habitat types and its set of corresponding habitat values and relations.

2. The method of claim 1, wherein the retail customer is an end user of the electronic content.

3. The method of claim 1, wherein:
    the selection is based on input received through a selection dialog on a graphical user interface, the selection dialog including a plurality of habitat types, each habitat type being associated with a check box.

4. The method of claim 1, wherein:
    the set of habitat values and relations is determined based on input from the retail customer.

5. The method of claim 4, wherein:
    the set of habitat values and relations is determined based on input received through a preferences dialog on a graphical user interface, the preferences dialog providing multiple fields in which the retail customer enters habitat values for the selected habitat types.

6. The method of claim 1, wherein the license further comprises:
a plurality of and-or logic expressions of habitat terms that are nested to multiple levels.

7. The method of claim 1, wherein the electronic content is an encrypted document and wherein each habitat term further comprises:
a key for use in decrypting the encrypted document.

8. The method of claim 7, wherein the expression is evaluated in a deterministic order and the key is extracted from the last habitat term in the and-or logic expression that is evaluated to render the entire and or logic expression true.

9. The method of claim 1, wherein each habitat term further comprises:
a set of access permissions for use in restricting access to the electronic content.

10. The method of claim 9, wherein the expression is evaluated in a deterministic order and the set of access permissions is extracted from the last habitat term in the and-or logic expression that is evaluated to render the and-or logic expression true.

11. The method of claim 9, wherein each habitat term has a different set of access permissions applicable to the electronic content.

12. The method of claim 1, wherein selecting a plurality of habitat types further comprises selecting habitat types based on input from a provider of the electronic content.

13. The method of claim 1, wherein the and-or logic expression of habitat terms is defined based on input from the retail customer.

14. The method of claim 1, wherein the and-or logic expression of habitat terms is defined based on input from a provider of the electronic content.

15. The method of claim 1, wherein the and-or logic expression of habitat terms is defined based on input from a third party distributor.

16. The method of claim 1, wherein each habitat type is a type of computer component, a type of computer peripheral device, a type of user information, a type of biometric information, a time, or a geographic location.

17. The method of claim 1, wherein input from the retail customer can effect selection of habitat types from a group comprising central processing unit, hard disk, removable medium, and login name.

18. The method of claim 1, wherein the license is stored in a file separate from the electronic content.

19. The method of claim 1, wherein the license is stored in a common file with the electronic content.

20. A computer implemented method for obtaining a license file to electronic content, comprising
receiving from a retail customer an input selecting a plurality of habitat types and a set of one or more habitat values for each of the selected habitat types; and
requesting from a server a license file to permit use of an electronic content, the license file including an and-or logic expression of habitat terms, each habitat term containing one of the selected habitat types and its corresponding set of habitat values.

21. A method for allowing an end user to access electronic content, comprising:
receiving electronic content at a user computer;
receiving a license file permitting use of the electronic content at the user computer, the license file including an and-or logic expression of habitat terms, each habitat term containing a set of access permissions, the habitat terms having been selected based on input from a retail customer;
extracting the set of access permissions from an evaluation of the expression that renders the expression true; and
allowing an end user to access the electronic content according to the extracted set of access permissions applicable to the electronic content.

22. The method of claim 21, wherein the set of access permissions is extracted from the last habitat term in the expression that is evaluated to render the expression true.

23. The method of claim 21, wherein the electronic content includes a universal set of access permissions applicable to the electronic content, the method further comprising:
defining access to the electronic content using both the universal set of access permissions and the extracted set of access permissions.

24. A computer program product stored on a machine readable medium for creating a license defining permissions to electronic content, the product comprising instructions operable to cause a programmable processor to:
select a plurality of habitat types, wherein each habitat type is an aspect of a user environment to which a license can be bound, and wherein the selection is based on input from a retail customer;
determine a set of one or more habitat values and relations for each of the selected habitat types; and
create a license to permit use of the electronic content, the license including an and-or logic expression of habitat terms, each habitat term containing one of the selected habitat types and its set of corresponding habitat values and relations.

25. The product of claim 24, wherein the retail customer is an end user of the electronic content.

26. The product of claim 24, wherein:
the input is received through a selection dialog on a graphical user interface, the selection dialog including a plurality of habitat types, each habitat type being associated with a check box.

27. The product of claim 24, wherein:
the set of habitat values and relations is determined based on input from the retail customer.

28. The product of claim 27, wherein:
the set of habitat values and relations is determined based on input received through a preferences dialog on a graphical user interface, the preferences dialog providing multiple fields in which the retail customer enters habitat values for the selected habitat types.

29. The product of claim 24, wherein the license further comprises:
a plurality of and-or logic expressions of habitat terms that are nested within each other.

30. The product of claim 24, wherein the electronic content is an encrypted document and wherein each habitat term further comprises:
a key for use in decrypting the encrypted document.

31. The product of claim 30, wherein the expression is evaluated in a deterministic order and the key is extracted from the last habitat term in the and-or logic expression that is evaluated to render the entire and-or logic expression true.

32. The product of claim 24, wherein each habitat term her comprises:
a set of access permissions for use in restricting access to the electronic content.

33. The product of claim 32, wherein the expression is evaluated in a deterministic order and the set of access permissions is extracted from the last habitat term in the and-or logic expression that is evaluated to render the and-or logic expression true.

34. The product of claim 32, wherein each habitat term has a different set of access permissions applicable to the electronic content.

35. The product of claim 24, further comprising instructions operable to cause a programmable processor to:
select a plurality of habitat types, wherein the selection is based on input from a provider of the electronic content.

36. The product of claim 24, wherein the and-or logic expression of habitat terms is defined based on input from the retail customer.

37. The product of claim 24, wherein the and-or logic expression of habitat terms is defined based on input from a provider of the electronic content.

38. The product of claim 24, wherein the and-or logic expression of habitat terms is defined based on input from a third party distributor.

39. The product of claim 24, wherein each habitat type is a central processing unit (CPU), a hard disk, a removable floppy disk, a CDROM, a removable disk cartridge, a flash memory card, a network drive, a user login name, a fingerprint, a handwritten signature, a smart card, a time or a geographic location.

40. A computer program product stored on a machine readable medium for obtaining a license file to electronic content, the product comprising instructions operable to cause a programmable processor to:
receive from a retail customer an input selecting a plurality of habitat types and a set of one or more habitat values for each of the selected habitat types; and
request from a server a license file to permit use of an electronic content, the license file including an and-or logic expression of habitat terms, each habitat term containing one of the selected habitat types and its corresponding set of habitat values.

41. A computer program product stored on a machine readable medium for allowing an end user to access electronic content, the product comprising instructions operable to cause a programmable processor to:
receive electronic content at a user computer;
receive a license file permitting use of the electronic content at the user computer, the license file including an and-or logic expression of habitat terms, each habitat term containing a set of access permissions, the habitat terms having been selected based on input from a retail customer;
extract the set of access permissions from an evaluation of the expression that renders the expression true; and
allow an end user to access the electronic content according to the extracted set of access permissions applicable to the electronic content.

42. The product of claim 41, wherein the access permissions are extracted from the last habitat term in the and-or expression that is evaluated to render the entire and-or expression true.

43. The product of claim 41, wherein the electronic content includes a universal set of access permissions applicable to the electronic content, the product further comprising instructions operable to cause a programmable processor to:
define access to the electronic content using both the universal set of access permissions and the extracted set of access permissions.

44. A system for creating a license defining permissions to use electronic content, comprising:
means for selecting a plurality of habitat types, wherein each habitat type is an aspect of a user environment to which a license can be bound, and wherein the selection is based on input from a retail customer;
means for determining a set of one or more habitat values and relations for each of the selected habitat types; and
means for creating a license to permit use of the electronic content, the license including an and-or logic expression of habitat terms, each habitat term containing one of the selected habitat types and its set of corresponding habitat values and relations.

45. The system of claim 44, wherein the retail customer is an end user of the electronic content.

46. The system of claim 44, wherein:
the selection is based on input received through a selection dialog on a graphical user interface, the selection dialog including a plurality of habitat types, each habitat type being associated with a check box.

47. The system of claim 44, wherein:
the set of habitat values and relations is determined based on input from the retail customer.

48. The system of claim 47, wherein:
the set of habitat values and relations is determined based on input received through a preferences dialog on a graphical user interface, the preferences dialog providing multiple fields in which the retail customer enters habitat values for the selected habitat types.

49. The system of claim 44, wherein the license further comprises:
a plurality of and-or logic expressions of habitat terms that are nested to multiple levels.

50. The system of claim 44, wherein the electronic content is an encrypted document and wherein each habitat term further comprises:
a key for use in decrypting the encrypted document.

51. The system of claim 50, wherein the expression is evaluated in a deterministic order and the key is extracted from the last habitat term in the and-or logic expression that is evaluated to render the entire and-or logic expression true.

52. The system of claim 44, wherein each habitat term further comprises:
a set of access permissions for use in restricting access to the electronic content.

53. The system of claim 52, wherein the expression is evaluated in a deterministic order and the set of access permissions is extracted from the last habitat term in the and-or logic expression that is evaluated to render the and-or logic expression true.

54. The system of claim 52, wherein each habitat term has a different set of access permissions applicable to the electronic content.

55. The system of claim 44, wherein the means for selecting a plurality of habitat types further comprises means for selecting habitat types based on input from a provider of the electronic content.

56. The system of claim 44, wherein the and-or logic expression of habitat terms is defined based on input from the retail customer.

57. The system of claim 44, wherein the and-or logic expression of habitat terms is defined based on input from a provider of the electronic content.

58. The system of claim 44, wherein the and-or logic expression of habitat terms is defined based on input from a third party distributor.

59. The system of claim 44, wherein each habitat type is a type of computer component, a type of computer peripheral device, a type of user information, a type of biometric information, a time, or a geographic location.

60. The system of claim 44, wherein input from the retail customer can effect selection of habitat types from a group comprising central processing unit, hard disk, removable medium, and login name.

61. The system of claim 44, wherein the license is stored in a file separate from the electronic content.

62. The system of claim 44, wherein the license is stored in a common file with the electronic content.

63. A computer implemented system for obtaining a license file to electronic content, comprising:

means for receiving from a retail customer an input selecting a plurality of habitat types and a set of one or more habitat values for each of the selected habitat types; and means for requesting from a server a license file to permit use of an electronic content, the license file including an and-or logic expression of habitat terms, each habitat term containing one of the selected habitat types and its corresponding set of habitat values.

64. A system for allowing an end user to access electronic content, comprising:

means for receiving electronic content at a user computer;

means for receiving a license file permitting use of the electronic content at the user computer, the license file including an and-or logic expression of habitat terms, each habitat term containing a set of access permissions, the habitat terms having been selected based on input from a retail customer;

means for extracting the set of access permissions from an evaluation of the expression that renders the expression true; and means for allowing an end user to access the electronic content according to the extracted set of access permissions applicable to the electronic content.

65. The system of claim 64, wherein the set of access permissions is extracted from the last habitat term in the expression that is evaluated to render the expression true.

66. The system of claim 64, wherein the electronic content includes a universal set of access permissions applicable to the electronic content, the system further comprising:

means for defining access to the electronic content using both the universal set of access permissions and the extracted set of access permissions.

\* \* \* \* \*

UNITED STATES PATENT AND TRADEMARK OFFICE
CERTIFICATE OF CORRECTION

| | | |
|---|---|---|
| PATENT NO. | : 7,149,721 B1 | Page 1 of 1 |
| APPLICATION NO. | : 09/655119 | |
| DATED | : December 12, 2006 | |
| INVENTOR(S) | : Richard L. Sites and James D. Pravetz | |

It is certified that error appears in the above-identified patent and that said Letters Patent is hereby corrected as shown below:

Column 7, line 14, delete "and or" and replace with --and-or--;
        line 52, insert a colon after "comprising";
Column 8, line 64, delete "her" and replace with --further--;

Signed and Sealed this

Thirtieth Day of January, 2007

JON W. DUDAS
*Director of the United States Patent and Trademark Office*